No. 696,995. Patented Apr. 8, 1902.
T. G. MOSER.
HANDLE FOR A NUMBER OF IMPLEMENTS.
(Application filed May 4, 1901.)

(No Model.)

Witnesses
Fred E. Maynard.
Chas. S. Hyer.

T. G. Moser, Inventor.
by C. A. Snow & Co
Attorneys

UNITED STATES PATENT OFFICE.

THOMAS G. MOSER, OF ELON COLLEGE, NORTH CAROLINA.

HANDLE FOR A NUMBER OF IMPLEMENTS.

SPECIFICATION forming part of Letters Patent No. 696,995, dated April 8, 1902.

Application filed May 4, 1901. Serial No. 58,782. (No model.)

*To all whom it may concern:*

Be it known that I, THOMAS G. MOSER, a citizen of the United States, residing at Elon College, in the county of Alamance and State of North Carolina, have invented certain new and useful Improvements in Handles for a Number of Implements, of which the following is a specification.

This invention relates to a handle for holding a reed-hook, comb, knife, and scissors for use by weavers; and the object of the same is to provide a simple and efficient handle for holding a number of tools arranged for separate use by weavers, the tools being closable into a particular form of handle in a manner similar to a clasp-knife.

The invention consists in the construction and arrangement of the several parts, which will be more fully hereinafter described and claimed.

Figure 1:
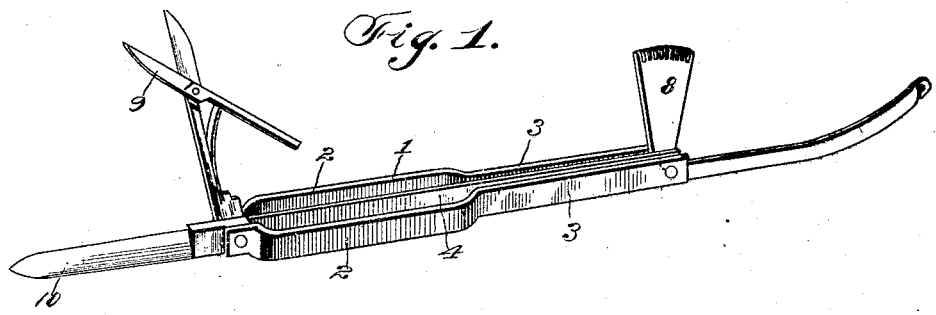
Figure 2:
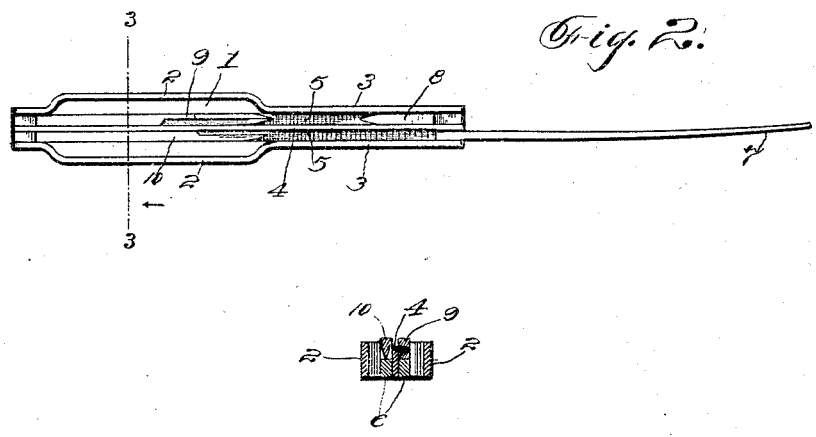
Figure 3:

In the drawings, Figure 1 is a perspective view of a handle embodying the features of the invention and showing the tools opened out from the handle thereof. Fig. 2 is a top plan view of the improved handle, showing one of the tools opened outwardly therefrom. Fig. 3 is a transverse vertical section on the line 3 3, Fig. 2.

Similar numerals of reference are employed to indicate corresponding parts in the several views.

The numeral 1 designates a handle comprising opposite side strips 2, which are transversely projected in parallel planes, as at 3, from about the central portions thereof to near the rear terminals of the same, to thereby provide a handle having a greater storing capacity at its rear portion and reduce the front extremity thereof for greater projection through small spaces in operating a tool opening out from said front end or extremity. The handle also has a central longitudinally-disposed partition-strip 4 therein, with space members 5 between the ends of the same and the adjacent ends of the side strips 2, back springs 6 being also mounted in the handle for obvious purposes. A reed-hook 7, a pick-out comb 8, a pair of scissors 9, and a knife-blade 10, which are all used by a weaver in various operations and adjustments about a loom or weaving-machine, are mounted in the handle. The reed-hook 7 is located at the reduced end of the handle, so that said hook may be conveniently used for reaching a considerable distance without being blocked by the handle. The scissors and knife-blade are foldable in the laterally-projecting or rear enlarged portion of the handle. When one of the tools is opened out for use, the others remain closed in the handle, and a very convenient implement is thus provided, which can be manufactured and sold at a small cost.

Having thus described the invention, what is claimed as new is—

A handle adapted to contain a number of implements having the front and back edges parallel and the sides from about the center to near the rear ends transversely projected and parallel, and a straight partition-strip extending centrally through the handle from end to end and parallel with the major portions of the sides.

In testimony that I claim the foregoing as my own I have hereto affixed my signature in the presence of two witnesses.

THOMAS G. MOSER.

Witnesses:
 THOS. THOMPSON,
 ALEX C. HOLT.